(12) United States Patent
Bain et al.

(10) Patent No.: US 11,039,692 B2
(45) Date of Patent: Jun. 22, 2021

(54) FIRE RETARDANT CUSHIONING DEVICES

(71) Applicant: Pneuma Pure IP Limited, Dublin (IE)

(72) Inventors: Duncan Bain, Kings Langley (GB);
David Woolfson, Dublin (IE)

(73) Assignee: Pneuma Pure I.P. Limited, Dublin (IE)

( * ) Notice: Subject to any disclaimer, the term of this patent is extended or adjusted under 35 U.S.C. 154(b) by 308 days.

(21) Appl. No.: 15/948,172

(22) Filed: Apr. 9, 2018

(65) Prior Publication Data
US 2019/0307260 A1 Oct. 10, 2019

(51) Int. Cl.
| | | |
|---|---|---|
| A47C 31/00 | (2006.01) |
| B32B 5/02 | (2006.01) |
| B32B 27/12 | (2006.01) |
| B32B 27/40 | (2006.01) |
| B32B 27/18 | (2006.01) |
| B29C 65/00 | (2006.01) |
| B29C 65/02 | (2006.01) |
| B29L 31/00 | (2006.01) |

(52) U.S. Cl.
CPC ............ *A47C 31/001* (2013.01); *B29C 65/02* (2013.01); *B29C 66/4332* (2013.01); *B29C 66/729* (2013.01); *B29C 66/7392* (2013.01); *B32B 5/026* (2013.01); *B32B 27/12* (2013.01); *B32B 27/18* (2013.01); *B32B 27/40* (2013.01); *B29L 2031/771* (2013.01); *B32B 2307/3065* (2013.01); *B32B 2601/00* (2013.01)

(58) Field of Classification Search
CPC ....... A47C 31/001; B32B 5/026; B32B 27/12; B32B 27/40; B32B 27/18; B29C 66/4332; B29C 66/729; B29C 66/7392; B29C 65/02
See application file for complete search history.

(56) References Cited

U.S. PATENT DOCUMENTS 4,430,765 A * 2/1984 Karpen ............... A47C 31/001
5/698
4,866,799 A * 9/1989 Glackin ............... A47C 31/001
5/698

(Continued)

FOREIGN PATENT DOCUMENTS

| EP | 0070701 B1 * | 9/1986 | ......... A47C 31/001 |
| FR | 2866534 A1 * | 8/2005 | ......... A47G 9/0207 |
| GB | 2486042 A * | 6/2012 | ......... A47C 31/001 |

*Primary Examiner* — Eric J Kurilla
*Assistant Examiner* — James T Coble
(74) *Attorney, Agent, or Firm* — Faegre Drinker Biddle & Reath LLP (57) ABSTRACT

A fire retardant cushioning device wherein the cushioning device comprises a main body formed of a fire retardant cover material which is assembled together from panels of fire retardant cover material with the panels being connected together by at least one welded seam extending about the edges of the panels of cover material to form a seamed fire retardant cover material comprising the main body of the cover and the seam(s); and wherein the construction of the cushioning device provides a fire retardant cushioning device having welded seam(s) whereby the welded seam(s) are configured such that they are flame retardant. A fire retardant, infection control cushioning device is also disclosed. The invention also provides a method of manufacturing the fire retardant cushioning device.

19 Claims, 3 Drawing Sheets

(56) References Cited

U.S. PATENT DOCUMENTS

| | | | | |
|---|---|---|---|---|
| 5,788,184 A | * | 8/1998 | Eddy | B32B 5/02 |
| | | | | 244/119 |
| 7,509,700 B2 | * | 3/2009 | Speer | A47C 27/005 |
| | | | | 428/74 |
| 2013/0267140 A1 | * | 10/2013 | Gstettner | D02G 3/047 |
| | | | | 442/302 |

* cited by examiner

FIRE RETARDANT CUSHIONING DEVICES

TECHNICAL FIELD

The present invention relates to fire retardant cushioning devices.

BACKGROUND

Although constructed of nominally fire retardant materials, known cushioning devices comprised of welded seams, such as for example those used in institutions, have been found to fail some fire retardancy tests, failing to self-extinguish as would be expected from the nature of the fire retardant materials used in their construction.

Heretofore, it has not been possible to provide a fully fire retardant cushioning device having welded seams due to the possibility that such a cushioning device could still, unpredictably, fail the BSI or similar Flame Safety and/or fire retardancy standards in other jurisdictions.

Throughout this patent specification, the term "cushioning device" is to be understood to refer to a cushion, pillow, duvet, mattress, a filled seat cover, padded or upholstered bedding, padded seating, or padded product, soft furnishing product and such like.

SUMMARY

The present invention provides a cushioning device wherein the cushioning device comprises a welded seam and contains fire retardant filling material and a fire retardant cover material and wherein the construction of the cushioning device provides a fire retardant cushioning device having welded seam(s).

The present invention also provides a method of constructing a fire retardant cushioning device.

It is an object of the present invention to provide a fire retardant cushioning device in which the wick effect of prior art external seams is reduced or eliminated.

Accordingly, the present invention provides a fire retardant cushioning device comprising welded seams, wherein the cushioning device contains fire retardant filling material and has a fire retardant cover material and wherein the construction of the cushioning device provides a fire retardant cushioning device having welded seams.

The cushioning device in accordance with the present invention reduces the wick effect of prior art external seams so as to provide a fire retardant cushioning device.

In one embodiment, the wick effect is mitigated by providing thicker material at the seam than at the rest of the cover of the cushioning device, so reducing the surface area/bulk ratio which renders the material so ignitable. This is achieved by doubling the edge of the external seam. That is, the edges of the seam to be welded are folded back to create additional thickness layers prior to welding.

In an alternative embodiment, the wick effect is reduced by rolling the edge of the external seam.

Alternatively, in yet a further embodiment, the reduction in the wick effect may be achieved by including an additional tape layer in the weld. This additional layer fuses to create a thicker seam, which therefore has less surface area to bulk ratio. The tape may be applied between the two layers of coated fabric, and/or outside and/or inside either coated layer. In an alternative embodiment, the tape may be applied outside and/or inside each layer of fabric in the region that forms the external seam. In a preferred embodiment, the tape is applied inside both layers that form the external seam.

Advantageously, the tape layer may be made of an intrinsically fire retardant fusible material to impart additional fire-retarding properties.

The tape layer preferably comprises polyurethane. Optionally, the tape layer may comprise a polyurethane/polyethylene composite.

Alternatively or additionally, the reduction in the wick effect may be achieved by bonding the seam flap to the body of the pillow, so that there is no protruding flap.

The cover of the cushioning device is preferably coated with fire retardant material.

In one preferred embodiment, the cushioning device of the present invention advantageously comprises an infection control cushioning device.

Preferably, in the infection control cushioning device embodiment, the cover material comprises a vent means, wherein the vent means comprises a filter medium for the removal of particles of microbial size, preferably for the removal of particles of 30 nm upwards in size.

The vent means may include a gasket adapted to ensure that edges of the vent joined to the cover of the cushioning device are sealed and impermeable to liquid.

In a further aspect, the invention provides a method of constructing a fire retardant cushioning device as described herein, wherein the method comprises the following steps:

(i) closing the cover material of the cushioning device on all but one side to form a partially closed inside-out cover;

(ii) turning the partially closed cover the right way out;

(iii) inserting filling material into the cover through the open side;

(iv) folding or rolling back the cover on the open side so as to thicken the portion of the cover to be welded; and (v) closing the folded or rolled back portion of the cover to form a seam.

In a preferred embodiment, one or more of the steps of closing the cover material, e.g. step (i), is achieved by welding. Alternatively or additionally, one or more of the closing steps may be achieved using an adhesive.

The portion of the cover to be welded has a top flap and a bottom flap. Preferably, both top and bottom flaps are folded or rolled back. Alternatively, only one of the top and bottom flap is folded or rolled back. Alternatively, one of the top or bottom flap is folded back and the other of the top or bottom flap is rolled back.

The portion of the cover to be welded has a top flap and a bottom flap. Optionally, an additional tape layer can be added in between the flaps prior to welding. The tape may be applied between the two layers of the cover and/or applied on the outside and/or the inside of the top and/or bottom flap. On welding, the additional layer or layers fuse with the flaps to create a thicker seam and thus a seam which has a lower surface area to bulk ratio. This results in a seam which acts less like a wick than prior art seams.

Advantageously, the tape may be made of an intrinsically fire retardant fusible material to impart additional fire-retarding properties.

Preferably, the external seam is bonded to the body of the cushioning device, so that there is no protruding flap. This may be done instead of or in addition to step (iv) above.

DESCRIPTION OF THE DRAWINGS

The invention will now be described with reference to the accompanying drawings which show by way of example only, embodiments of the cushioning device in accordance with the invention. In the drawings.

DETAILED DESCRIPTION

In the process of creating a sealed cover with welded seams, e.g. for a cushioning device, it is usually necessary for at least one seam to be an external seam. For example, to construct a sealed pillow, a pillow cover (also known as a pillowcase) may be welded inside-out on three sides, so that those seams will be internal seams when the pillowcase is turned out, and so is no longer inside-out. At this stage, one side must be left open, to allow the filling materials to be stuffed into the pillowcase. This leaves one remaining seam which must be welded such that the welded seam is external to the pillowcase. Typically, this external seam consists of the same type of welded seam as the internal seams, namely two layers of fabric welded together over a wide enough margin to prevent subsequent peeling apart. The only difference between the internal and external seams is that the internal seams are effected prior to turning the cover inside-out. The result is that the internal seams have a margin of welded sheet material protruding inwards, inside the cover, whereas the external seam has a margin protruding outwards.

The inventors have made the surprising discovery that the external seam is the main cause of failure for fire retardancy tests in products fabricated from nominally fire-retardant materials. This surprising discovery was confirmed by subsequent observations including by studying slow-motion video of products with different types of seam that the external seam initiated ignition and also prolonged smouldering in the product.

The tendency to initiate ignition may be explained by the high surface-area to bulk ratio presented by the external seam to the flame. Like a candle wick, the touch-paper of a firework, or the role of paper in fire-lighting, this allows fast delivery of heat and oxygen to the surface of the material, making combustion more easily activated than for a thicker material.

The tendency for the seam to prolong smouldering of the rest of the product can be explained as analogous to a wick in a candle or lantern. The essential features of a wick are as follows:

1) A relatively non-combustible or slowly combustible material acts as a carrier for relatively combustible material, or fuel source;
2) The wick is embedded in or submerged in the fuel source;
3) The wick material has a high degree of capillarity, to draw molten or liquid flammable material to the site of combustion; and
4) The wick remains non-combusted, while the fuel material is combusted.

In welded sealed cushioning materials, the typical final weld, i.e. the external seam, comprises all four of the above essential features of a wick. In general, a knitted fibrous yarn material such as polyamide is coated with a matrix layer of a sealing material such as polyurethane. Welded back-to-back, the fibrous material (therefore of high capillarity) is now embedded within a matrix of a fusible fuel material.
Reducing the 'Wick' Effect
Sacrificial Combustibility A feature of a wick is that it remains non-combusted in the process of burning the fuel. Analysis of the composition of prior art welded cushioning materials shows that this is happening, for long enough to keep the cushion smouldering.

The fire retardant cover material of the cushioning device of the present invention preferably comprises fibrous knitted backing layer, particularly preferably wherein the fibrous knitted backing layer is made of a more flammable material (rather than less flammable material) than that of the cover material itself. This may be achieved by omitting fire-retardant agents from the composition of the fibrous knitted backing layer, or by selecting a different material to that of the cover material. Although this provides easier ignition to start the combustion process, counter-intuitively the fire self-extinguishes faster, because the more flammable fibrous knitted backing acts as a wick material and burns out, and is thus not able to function as a wick.
Denaturing Capillarity Another feature of a wick is that it has sufficient capillarity to draw molten or liquid fuel to the site of combustion. In the case of a coated fabric, this capillarity arises from the fibres in the yarn, and in the knitted or woven architecture of the base fabric, prior to application of the coating. Typically, a weld will be achieved by melting/fusing the coating material, which has a relatively low melting point, while the fibres in the yarn, and in the knitted or woven architecture of the base fabric material (that is the base fibrous fabric material under the coating) remain relatively intact. Thus, the bond consists of fused and re-solidified coating material.

In the case of the prior art, in fabrics welded back-to-back with woven/knitted fabric on the inside of the construction, molten coating material permeates the central fabric and meets the molten material of the opposite coating before solidifying. Thus, the architecture of the fibrous fabric is maintained, and so are its capillarity properties. The inventors have identified this problem and have, surprisingly, found a solution for the problem so as to provide a fire retardant cushioning device. By adjusting the temperature/time/pressure profile of the weld, the architecture of the base, fibrous fabric material is denatured in the welding process. In the cushioning device of the present invention and in the method for its production, the fibres within the yarn in the knitted or woven architecture of the base fabric material, fuse and combine, leaving a single homogeneous filament with little capillarity yet maintaining the overall knitted/woven structure for strength.

It is an object of the present invention to provide a fire retardant cushioning device in which the wick effect of prior art external seams is reduced or eliminated. Accordingly, the present invention provides a fire retardant cushioning device comprising welded seams, wherein the cushioning device contains fire retardant filling material and has a fire retardant cover material and wherein the construction of the cushioning device provides a fire retardant cushioning device having welded seams. The cushioning device in accordance with the present invention reduces the wick effect of prior art external seams so as to provide a fire retardant cushioning device.

Preferably, a yarn of the fibrous fabric material layer is coated with coating material. The yarn consists of multiple fibres twined or otherwise combined. Subject to heat, the fibres fuse and combine, so that in the welded region a single homogeneous yarn material remains in the centre of the seam.

Alternatively, increasing welding time will also fuse the knitted/woven architecture, creating still less capillarity. This may result in a homogeneous material at the centre combining both original yarn material and coating material. This may be done preferentially at the outer margin of the weld, where less strength is required, as it is not vulnerable to peel forces.

Preferably, the cushioning device of the present invention is a hermetically sealed cushioning device.

Figure 1:
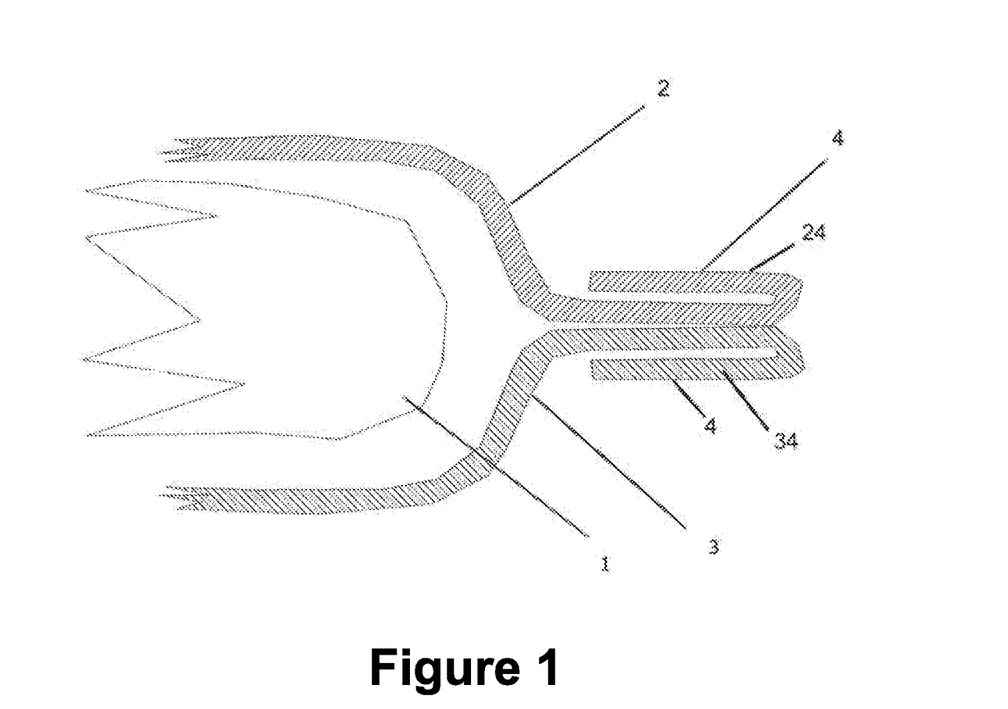
FIG. 1 is a partial view of a preferred embodiment of the cushioning device according to the invention.

Referring to FIG. 1, the internal filling, indicated generally by the reference numeral 1, is enclosed in a sealed casing comprising top sheet 2 and bottom sheet 3. The edges 4 of the top sheet 2 and the bottom sheet 3 to be welded, are folded back over a portion of each respective edge of top sheet 2 and bottom sheet 3, to create additional thickness layers 24 and 34, prior to welding to form a seam. In FIG. 1, both the top flap 2 and bottom flap 3 of the cover are folded back.

Figure 2:
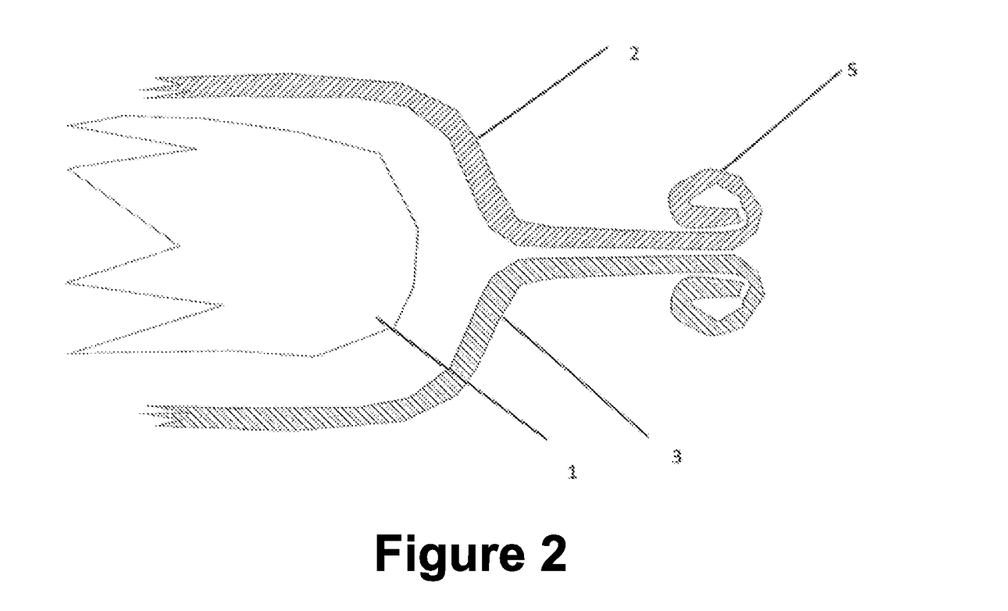
FIG. 2 is a partial view of an alternative preferred embodiment of the cushioning device according to the invention.

Referring now to FIG. 2, reducing the wick effect may, in an alternative embodiment, be achieved by rolling the edge 5 of the external seam. In FIG. 2, both the top flap and bottom flap of the cover are rolled back.

Figure 3:
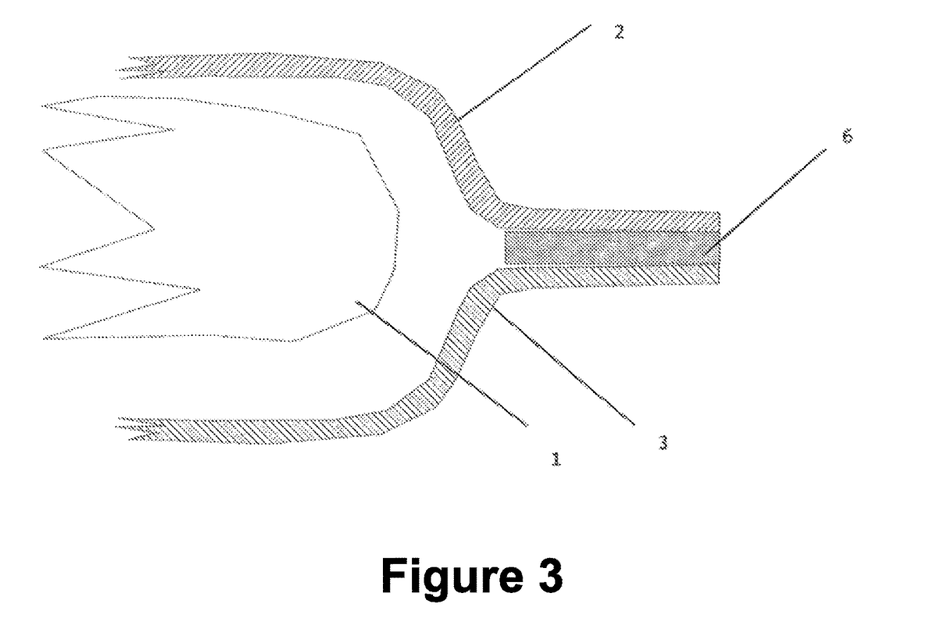
FIG. 3 is a partial view of another alternative preferred embodiment of the cushioning device according to the invention.

Alternatively, as shown in FIG. 3, the reduction in the wick effect may be achieved by including an additional tape layer 6 in the weld, FIG. 3. This additional tape layer 6 is ideally formed of fire retardant Polyurethane (PU) material. This additional layer 6 fuses to create a thicker seam, which therefore has less surface area to bulk ratio.

Figure 4:
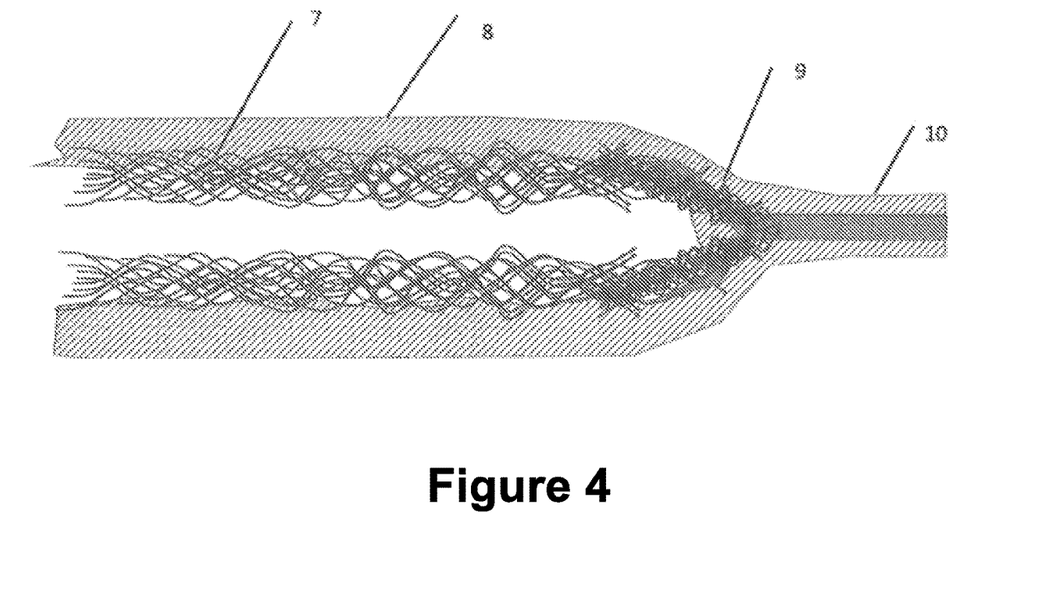
FIG. 4 is a partial view of yet another alternative preferred embodiment of the cushioning device according to the invention.

FIG. 4 shows a partial view of a cushioning device according to the invention in which a single yarn 7 of the fibrous layer is coated with coating material 8. The yarn consists of multiple fibres twined or otherwise combined. Subject to heat, the fibres fuse and combine 9, so that in the welded region 10, a single homogeneous yarn material remains in the centre of the seam.

Figure 5:
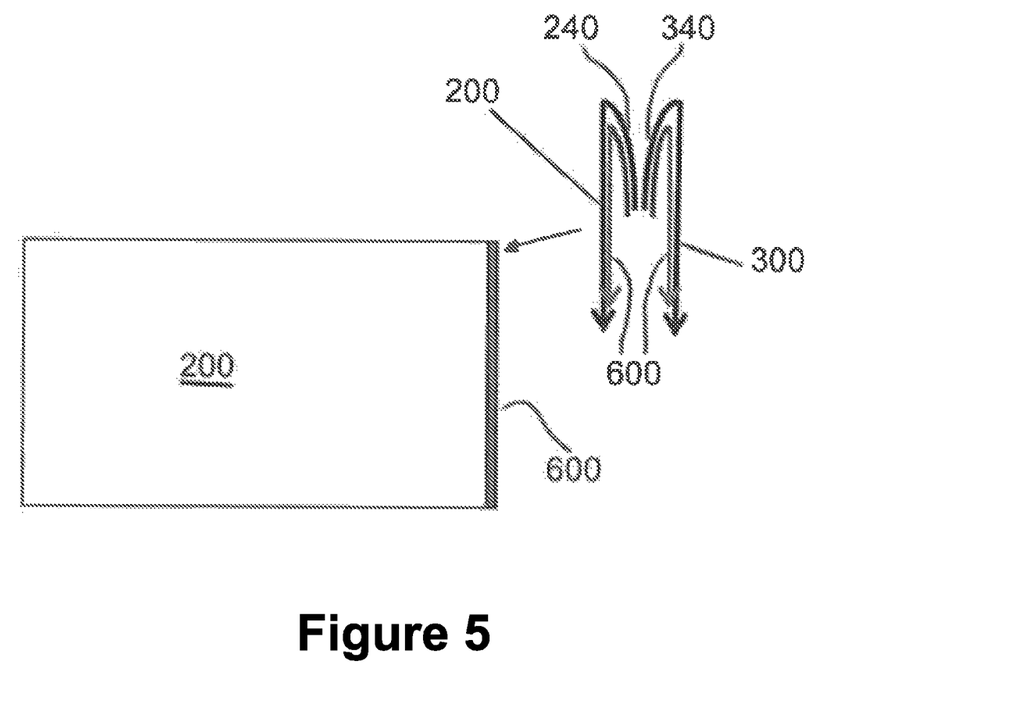
FIG. 5 is a cross-sectional view of a further alternative embodiment in which at least one strip of fire retardant PU tape applied to each of the two folded back edges.

Referring now to FIG. 5, an alternative embodiment is shown in which an additional tape layer 600 in the form of a strip of fire retardant PU tape is applied to each of the two folded back edges 240,340 of pillow fabric 200,300. In this embodiment, the upper layer of the cover is indicated by reference numeral 200 and the lower layer of the cover is indicated by reference numeral 300. The pillow cover fabric 200,300 is preferably formed of a polyurethane material with a nylon backing. In this embodiment, the fire retardant sealing tape layer 600 is in the form of a PU sealing tape. FIG. 5 is a cross section depiction showing how the fire retardant cushioning device and the method for forming a fire retardant cushioning device achieves formation of a weld into the corner of the cushioning device. This construction has the advantage that it achieves the formation of a hermetic seal into the corner of the cushioning device cover. This construction results in consistently favourable hydrostatic head test results. Thus, by providing an elongate strip of PU sealing tape 600 into the side of the pillow cover at either side of the hem allowance as shown in FIG. 5, a hermetic seal is formed which is consistently fire retardant in construction. Thus, in this preferred construction, using 2 strips of fire retardant PU tape into the side at either side of the hem allowance as shown in FIG. 5 provides a significant technical advantage.

Accordingly, features of the invention are disclosed in the following numbered statements:

1. A fire retardant cushioning device wherein the cushioning device comprises a main body formed of a fire retardant cover material which is assembled together from panels of fire retardant cover material with the panels being connected together by at least one welded seam extending about the edges of the panels of cover material to form a seamed fire retardant cover material comprising the main body of the cover and the seam(s); and wherein the construction of the cushioning device provides a fire retardant cushioning device having welded seam(s) whereby the welded seam(s) are configured such that they are flame retardant.
2. A flame retardant cushioning device as in statement 1 wherein the material from which the seam(s) are formed, is constructed from a thicker fire retardant material than the material that forms the main body of the cover of the cushioning device.
3. A flame retardant cushioning device as in statement 2 wherein the seam(s) are formed by doubling the edge of the external seam so as to create additional thickness in the seam layers, prior to forming the welded seam.
4. A flame retardant cushioning device as in statement 2 wherein the seam(s) are formed by rolling the edge of the external seam.
5. A flame retardant cushioning device as in statement 2 wherein the flame retardant seam(s) are formed by including an additional layer in the welded seam, in addition to the fabric from which the seam is formed wherein the additional layer fuses to create a thicker seam, whereby a lower surface area to bulk ratio is provided than in a standard cushioning device.
6. A flame retardant cushioning device as in statement 5 wherein the additional layer is formed of a layer of tape wherein the tape layer fuses to create a thicker seam than in a standard cushioning device.
7. A flame retardant cushioning device as in statement 6 wherein the tape is applied between any of the following: between the two layers of coated fabric from which the seam is formed; and/or outside and/or inside either coated layer of the two layers of fabric from which the seam is formed.
8. A fire retardant cushioning device as in statement 6 wherein the cushioning device comprises an external seam along one side of the cushioning device; and wherein the tape is applied outside and/or inside each layer of fabric in the region that forms the external seam.
9. A fire retardant cushioning device as in statement 8 wherein the cushioning device comprises an external seam along one side of the cushioning device and wherein the tape is applied inside both layers of fabric that form the external seam.
10. A fire retardant cushioning device as in statement 6 wherein the tape layer is manufactured from an intrinsically fire retardant fusible material to impart additional fire-retarding properties.
11. A fire retardant cushioning device as in any one of statements 6 to 10 wherein the additional layer comprises polyurethane.
12. A fire retardant cushioning device as in statement 11 wherein the additional layer comprises a polyurethane/polyethylene composite material.

13. A fire retardant cushioning device as in statement 12 wherein the cushioning device also comprises a seam flap and the seam flap is bonded to the body of the cushioning device so that there is no protruding flap.
14. A fire retardant cushioning device as in any one of the preceding statements wherein the cover of the cushioning device is coated with fire retardant material.
15. A fire retardant cushioning device as in any one of the preceding statements wherein the fire retardant cushioning device comprises a fire retardant filling material provided within the seamed fire retardant cover material.
16. A fire retardant cushioning device as in any one of the preceding statements wherein the cover material comprises a fibrous knitted backing layer.
17. A fire retardant cushioning device as in statement 16 wherein the fibrous knitted backing layer is made of a more flammable material than that of the cover material itself.
18. A fire retardant cushioning device as in statement 17 wherein the fibrous knitted backing layer is made of a more flammable material than that of the cover material itself by omitting fire-retardant agents from the composition of the fibrous knitted backing layer whereby although the backing layer provides easier ignition to start the combustion process, the fire self-extinguishes faster.
19. A fire retardant cushioning device as in statement 17 wherein the fibrous knitted backing layer is made of a more flammable material than that of the cover material itself by having the backing layer formed of a different material from that of the cover material.
20. A fire retardant cushioning device as in any one of the preceding statements wherein the architecture of the base, fibrous fabric material of which the weld of the welded seam is formed, is denatured whereby by adjusting the temperature/time/pressure profile of the weld of the welded seam, the fibres within the yarn in the knitted or woven architecture of the base fabric material, fuse and combine, leaving a single homogeneous filament having little capillarity yet maintaining the overall knitted/woven structure for strength.
21. A fire retardant cushioning device as in statement 20 wherein a yarn of the fibrous layer is coated with coating material; whereby when subjected to heat, fibres of which the yarn is comprised, fuse and combine, so that in the welded seam, a single homogeneous yarn material remains in the centre of the seam.
22. A cushioning device in accordance with any of the preceding statements wherein the cushioning device is a hermetically sealed cushioning device.
23. A fire retardant cushioning device as in any one of the preceding statements wherein the cushioning device comprises an infection control cushioning device.
24. A fire retardant cushioning device as in statement 23 wherein the infection control cushioning device comprises cover material provided with a vent means, wherein the vent means comprises a filter medium for the removal of particles of microbial size, preferably for the removal of particles of 30 nm upwards in size.
25. A fire retardant cushioning device as in statement 24 wherein the infection control cushioning device comprises cover material provided with a vent means, wherein the vent means comprises a filter medium for the removal of particles of 30 nm upwards in size.
26. A fire retardant cushioning device as in statement 24 wherein the infection control cushioning device comprises cover material provided with a vent means and the vent means comprises a gasket adapted to ensure that edges of the vent joined to the cover of the cushioning device are sealed and impermeable to liquid.
27. A method of constructing a fire retardant cushioning device as in any one of statements 1 to 26, wherein the method comprises the following steps:
    (i) with the cover of the fire retardant cushioning device turned inside out, closing the cover material of the cushioning device on all sides except for one side so as to form a partially closed inside-out cushioning device cover;
    (ii) turning the partially closed cushioning device cover the right way out so as to provide the cushioning device cover which has the closed sides along the internal faces of the cushioning device cover but has one side;
    (iii) inserting filling material into the cover through the open side of the cushioning device cover;
    (iv) folding or rolling back the cover material that is along the open side so as to thicken the portion of the cushioning device cover along the open side; and
    (v) closing the folded or rolled back portion of the cover material on the open side to form a seam.
28. A method of constructing a fire retardant cushioning device as in statement 27 wherein one or more of the steps of closing the cover material including at step (i) or at step (v) is achieved by welding.
29. A method of constructing a fire retardant cushioning device as in statement 27 or statement 28 wherein one or more of the closing steps including at step (i) or step (v) is achieved using an adhesive.
30. A method of constructing a fire retardant cushioning device as in statement 27 or statement 28 wherein the method comprises the step of providing a fibrous knitted backing layer on the cover material.
31. A method of constructing a fire retardant cushioning device as in statement 30 wherein the fibrous knitted backing layer is made of a more flammable material than that of the cover material itself.
32. A method of constructing a fire retardant cushioning device as in statement 31 wherein the method comprises the step of providing the fibrous knitted backing layer being made of a more flammable material than that of the cover material by omitting fire-retardant agents from the composition of the fibrous knitted backing layer whereby although the backing layer provides easier ignition to start the combustion process, the fire self-extinguishes faster.
33. A method of constructing a fire retardant cushioning device as in statement 31 wherein the method comprises the step of providing the fibrous knitted backing layer being made of a more flammable material than that of the cover material itself by having the backing layer formed of a different material from that of the cover material.
34. A method of constructing a fire retardant cushioning device as in any one of statements 27 to 33 wherein the method comprises the step of denaturing the architecture of the base, fibrous fabric material of which the weld of the welded seam is formed, by adjusting the temperature/time/pressure profile of the weld of the welded seam such that the fibres within the yarn in the knitted or woven architecture of the base fabric material, fuse and combine, leaving a single homogeneous filament having little capillarity yet maintaining the overall knitted/woven structure for strength.
35. A method of constructing a fire retardant cushioning device as in statement 34 wherein the step of denaturing the architecture of the base, fibrous fabric material of which the weld of the welded seam is formed, comprises the steps of: coating a yarn of the fibrous layer with a coating material; subjected the yarn to heat by welding whereby the fibres of which the yarn is comprised fuse and combine, so that in the welded seam, a single homogeneous yarn material remains in the centre of the seam.

36. A method of constructing a fire retardant cushioning device as in statement 34 or statement 35 wherein the step of denaturing the architecture of the base, fibrous fabric material of which the weld of the welded seam is formed, comprises the steps of: increasing welding time so as to fuse the knitted/woven architecture thereby creating even further reduced capillarity.

Additional features of the invention are disclosed in the following numbered examples:

1. A fire retardant cushioning device wherein the cushioning device comprises a main body formed of a fire retardant cover material which is assembled together from panels of fire retardant cover material with the panels being connected together by at least one welded seam extending about the edges of the panels of cover material to form a seamed fire retardant cover material comprising the main body of the cover and the seam(s); and wherein the construction of the cushioning device provides a fire retardant cushioning device having welded seam(s) whereby the welded seam(s) are configured such that they are flame retardant.
2. A flame retardant cushioning device as in example 1 wherein the material from which the seam(s) are formed, is constructed from a thicker fire retardant material than the material that forms the main body of the cover of the cushioning device.
3. A flame retardant cushioning device as in example 2 wherein the seam(s) are formed by doubling the edge of the external seam so as to create additional thickness in the seam layers, prior to forming the welded seam.
4. A flame retardant cushioning device as in example 2 wherein the seam(s) are formed by rolling the edge of the external seam.
5. A flame retardant cushioning device as in example 2 wherein the flame retardant seam(s) are formed by including an additional layer in the welded seam, in addition to the fabric from which the seam is formed wherein the additional layer fuses to create a thicker seam, whereby a lower surface area to bulk ratio is provided than in a standard cushioning device.
6. A flame retardant cushioning device as in example 5 wherein the additional layer is formed of a layer of tape wherein the tape layer fuses to create a thicker seam than in a standard cushioning device.
7. A flame retardant cushioning device as in example 6 wherein the tape is applied between any of the following: between the two layers of coated fabric from which the seam is formed; and/or outside and/or inside either coated layer of the two layers of fabric from which the seam is formed.
8. A fire retardant cushioning device as in example 6, wherein the cushioning device comprises an external seam along one side of the cushioning device; and wherein the tape is applied outside and/or inside each layer of fabric in the region that forms the external seam.
9. A fire retardant cushioning device as in example 8, wherein the cushioning device comprises an external seam along one side of the cushioning device and wherein the tape is applied inside both layers of fabric that form the external seam.
10. A fire retardant cushioning device as in example 6, wherein the tape layer is manufactured from an intrinsically fire retardant fusible material to impart additional fire-retarding properties.
11. A fire retardant cushioning device as in any one of examples 6 to 10, wherein the additional layer comprises polyurethane.
12. A fire retardant cushioning device as in example 11, wherein the additional layer comprises a polyurethane/polyethylene composite material.
13. A fire retardant cushioning device as in example 12, wherein the cushioning device also comprises a seam flap and the seam flap is bonded to the body of the cushioning device so that there is no protruding flap.
14. A fire retardant cushioning device as in any one of the preceding examples, wherein the cover of the cushioning device is coated with fire retardant material.
15. A fire retardant cushioning device as in any one of the preceding examples, wherein the fire retardant cushioning device comprises a fire retardant filling material provided within the seamed fire retardant cover material.
16. A fire retardant cushioning device as in any one of the preceding examples, wherein the cover material comprises a fibrous knitted backing layer.
17. A fire retardant cushioning device as in example 16, wherein the fibrous knitted backing layer is made of a more flammable material than that of the cover material itself.
18. A fire retardant cushioning device as in example 17, wherein the fibrous knitted backing layer is made of a more flammable material than that of the cover material itself by omitting fire-retardant agents from the composition of the fibrous knitted backing layer whereby although the backing layer provides easier ignition to start the combustion process, the fire self-extinguishes faster.
19. A fire retardant cushioning device as in example 17, wherein the fibrous knitted backing layer is made of a more flammable material than that of the cover material itself by having the backing layer formed of a different material from that of the cover material.
20. A fire retardant cushioning device as in any one of the preceding examples, wherein the architecture of the base, fibrous fabric material of which the weld of the welded seam is formed, is denatured whereby by adjusting the temperature/time/pressure profile of the weld of the welded seam, the fibres within the yarn in the knitted or woven architecture of the base fabric material, fuse and combine, leaving a single homogeneous filament having little capillarity yet maintaining the overall knitted/woven structure for strength.
21. A fire retardant cushioning device as in example 20, wherein a yarn of the fibrous layer is coated with coating material; whereby when subjected to heat, fibres of which the yarn is comprised, fuse and combine, so that in the welded seam, a single homogeneous yarn material remains in the centre of the seam.
22. A fire retardant cushioning device as in any one of the preceding examples, wherein the cushioning device is a hermetically sealed cushioning device.
23. A fire retardant cushioning device as in any one of the preceding examples, wherein the cushioning device comprises an infection control cushioning device.
24. A fire retardant cushioning device as in example 23, wherein the infection control cushioning device comprises cover material provided with a vent means, wherein the vent means comprises a filter medium for the removal of particles of microbial size, preferably for the removal of particles of 30 nm upwards in size.

25. A fire retardant cushioning device as in example 24, wherein the infection control cushioning device comprises cover material provided with a vent means, wherein the vent means comprises a filter medium for the removal of particles of 30 nm upwards in size.

26. A fire retardant cushioning device as in example 24, wherein the infection control cushioning device comprises cover material provided with a vent means and the vent means comprises a gasket adapted to ensure that edges of the vent joined to the cover of the cushioning device are sealed and impermeable to liquid.

27. A method of constructing a fire retardant cushioning device as in any one of examples 1 to 26, wherein the method comprises the following steps:
   (i) with the cover of the fire retardant cushioning device turned inside out, closing the cover material of the cushioning device on all sides except for one side so as to form a partially closed inside-out cushioning device cover;
   (ii) turning the partially closed cushioning device cover the right way out so as to provide the cushioning device cover which has the closed sides along the internal faces of the cushioning device cover but has one side;
   (iii) inserting filling material into the cover through the open side of the cushioning device cover;
   (iv) folding or rolling back the cover material that is along the open side so as to thicken the portion of the cushioning device cover along the open side; and
   (v) closing the folded or rolled back portion of the cover material on the open side to form a seam.

28. A method of constructing a fire retardant cushioning device as in example 27, wherein one or more of the steps of closing the cover material including at step (i) or at step (v) is achieved by welding.

29. A method of constructing a fire retardant cushioning device as in example 27 or example 28, wherein one or more of the closing steps including at step (i) or step (v) is achieved using an adhesive.

30. A method of constructing a fire retardant cushioning device as in example 27 or example 28, wherein the method comprises the step of providing a fibrous knitted backing layer on the cover material.

31. A method of constructing a fire retardant cushioning device as in example 30, wherein the fibrous knitted backing layer is made of a more flammable material than that of the cover material itself.

32. A method of constructing a fire retardant cushioning device as in example 31, wherein the method comprises the step of providing the fibrous knitted backing layer being made of a more flammable material than that of the cover material by omitting fire-retardant agents from the composition of the fibrous knitted backing layer whereby although the backing layer provides easier ignition to start the combustion process, the fire self-extinguishes faster.

33. A method of constructing a fire retardant cushioning device as in example 31, wherein the method comprises the step of providing the fibrous knitted backing layer being made of a more flammable material than that of the cover material itself by having the backing layer formed of a different material from that of the cover material.

34. A method of constructing a fire retardant cushioning device as in any one of examples 27 to 33, wherein the method comprises the step of denaturing the architecture of the base, fibrous fabric material of which the weld of the welded seam is formed, by adjusting the temperature/time/pressure profile of the weld of the welded seam such that the fibres within the yarn in the knitted or woven architecture of the base fabric material, fuse and combine, leaving a single homogeneous filament having little capillarity yet maintaining the overall knitted/woven structure for strength.

35. A method of constructing a fire retardant cushioning device as in example 34, wherein the step of denaturing the architecture of the base, fibrous fabric material of which the weld of the welded seam is formed, comprises the steps of:
   coating a yarn of the fibrous layer with a coating material; and
   subjecting the yarn to heat by welding whereby the fibres of which the yarn is comprised fuse and combine, so that in the welded seam, a single homogeneous yarn material remains in the centre of the seam.

36. A method of constructing a fire retardant cushioning device as in examples 34 or 35 wherein the step of denaturing the architecture of the base, fibrous fabric material of which the weld of the welded seam is formed, comprises increasing welding time so as to fuse the knitted/woven architecture thereby creating even further reduced capillarity 37. A fire retardant cushioning device substantially as herein described with reference to and as shown in the accompanying drawings.

38. A method of constructing a fire retardant cushioning device, substantially as herein described with reference to the accompanying drawings.

It will of course be understood that the invention is not limited to the specific details as herein described, which are given by way of example only, and that various alterations and modifications are possible without departing from the scope of the invention as defined herein in the appended Claims.

The invention claimed is:
1. A fire retardant cushioning device comprising:
   a fire retardant cover having a body, a first flap extending from the body and comprising a first edge of the fire retardant cover, and a second flap extending from the body and comprising a second edge of the fire retardant cover;
   wherein the first flap and the second flap are welded together forming a welded seam,
   wherein the fire retardant cover is comprised of knitted or woven yarn of fibers, and
   wherein in the welded seam the fibers of the yarn are fused to leave marginal or no capillary function yet maintaining the knitted or woven structure, thus rendering the welded seam flame retardant.

2. The fire retardant cushioning device of claim 1, wherein the fire retardant cover comprises at least two panels of fire retardant material.

3. The fire retardant cushioning device of claim 1, wherein the flame retardant welded seam comprises at least four layers of the fire retardant cover.

4. The fire retardant cushioning device of claim 3, wherein the first flap is folded over to provide two layers, wherein the second flap is folded over to provide two layers, and wherein the flame retardant welded seam comprises the two layers of the first flap and the two layers of the second flap.

5. The fire retardant cushioning device of claim 3, wherein the first flap is rolled to provide at least two layers, wherein the second flap is rolled to provide at least two layers, and wherein the flame retardant welded seam comprises the at least two layers of the first flap and the at least two layers of the second flap.

6. The fire retardant cushioning device of claim 1, further comprising a tape positioned intermediate the first flap and the second flap, wherein the tape is fused with the first flap and the second flap.

7. The fire retardant cushioning device of claim 6, wherein at least a first side of the first flap of the fire retardant cover is coated with a fire retardant material, and wherein the tape is fused to the first side.

8. The fire retardant cushioning device of claim 6, wherein the welded seam is an external seam, and wherein the tape is applied outside and/or inside each of the first flap and the second flap.

9. The fire retardant cushioning device of claim 6, wherein the tape comprises an intrinsically fire retardant fusible material.

10. The fire retardant cushioning device of claim 6, wherein the tape comprises polyurethane.

11. The fire retardant cushioning device of claim 1, wherein a sealed seam extends from the body to form a sealed flap, and wherein the sealed flap is bonded to the body so that the sealed flap does not protrude from the body.

12. The fire retardant cushioning device of claim 1, further comprising a fire retardant filling material provided within the body.

13. The fire retardant cushioning device of claim 1, wherein the fire retardant cover comprises a fibrous knitted backing layer.

14. The fire retardant cushioning device of claim 13, wherein the fibrous knitted backing layer comprises yarn coated with a coating material.

15. The fire retardant cushioning device of claim 13, wherein the fibrous knitted backing layer is more flammable than the fire retardant cover.

16. The fire retardant cushioning device of claim 13, wherein the fibrous knitted backing layer is devoid of fire-retardant agents.

17. The fire retardant cushioning device of claim 14, wherein the fire retardant cover comprises the fibrous knitted backing layer and an additional layer of material.

18. The fire retardant cushioning device of claim 1, wherein the welded seam is denatured.

19. The fire retardant cushioning device of claim 1, wherein the fire retardant cover comprises a coating of a polymer having lower melt index than the knitted or woven yarn.

* * * * *